Figure 1:
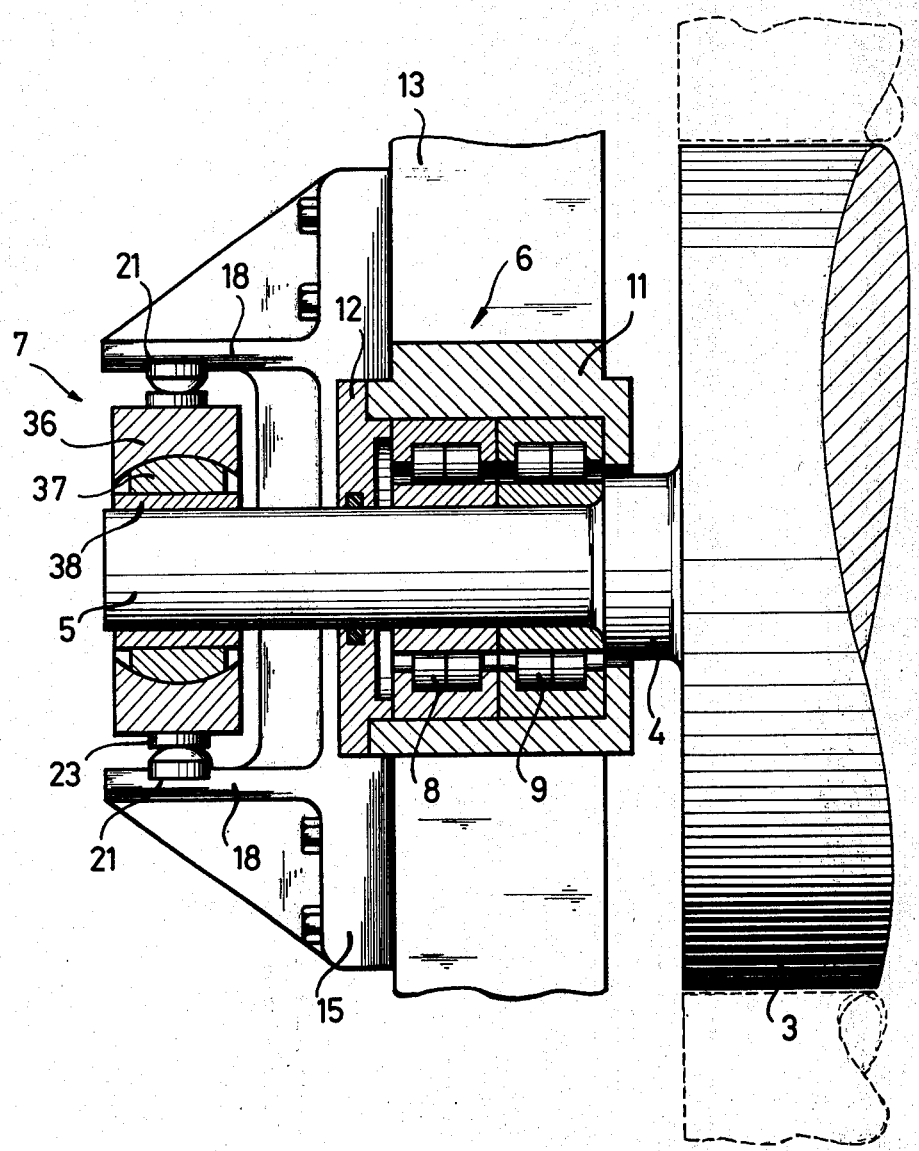

United States Patent [19]
Pawelczyk et al.

[11] 3,993,424
[45] Nov. 23, 1976

[54] ROLL CALENDERS FOR CALENDERING RUBBER OR SYNTHETIC PLASTICS MATERIALS

[75] Inventors: Werner Pawelczyk; Ernst Albrecht, both of Misburg, Germany

[73] Assignee: Hermann Berstorff Maschinenbau GmbH, Hannover, Germany

[22] Filed: Sept. 10, 1975

[21] Appl. No.: 612,211

[30] Foreign Application Priority Data
Oct. 1, 1974  Germany............................ 2446771

[52] U.S. Cl. ............................... 425/363; 425/471; 425/DIG. 235; 308/22
[51] Int. Cl.² .......................................... B29C 15/00
[58] Field of Search .. 425/328, 363, 335, DIG. 235, 425/471; 100/155 R; 248/130; 29/110; 305/20, 21, 22

[56] References Cited
UNITED STATES PATENTS

| | | | |
|---|---|---|---|
| 2,335,800 | 11/1943 | Sheperdson et al. | 308/22 X |
| 2,825,217 | 3/1958 | Byrd | 425/DIG. 235 |
| 3,016,819 | 1/1962 | Kupka | 425/DIG. 235 |
| 3,023,695 | 3/1962 | Kuster | 425/DIG. 235 |
| 3,140,900 | 7/1964 | Martin | 308/22 |
| 3,263,284 | 8/1966 | Orr et al. | 425/DIG. 235 |

Primary Examiner—Robert L. Spicer, Jr.
Attorney, Agent, or Firm—Donald D. Jeffery

[57] ABSTRACT

A roll calender, for calendering rubber or synthetic plastics materials and including roll counter bending means and roll oblique positioning means, wherein at least one roll of the calender has journal portions at the ends thereof supported in main support bearings and outer end portions of the journals engaged in spherical bearings, an outer portion of each spherical bearing has each of its two opposite sides rigidly connected to a respective hydraulic cylinder, each hydraulic cylinder has a piston therein with the piston secured to a vertical piston rod, intermediate the ends of the piston rod, such that counter bending of the roll can be effected by pressurisation of the hydraulic cylinders selectively above or below the pistons, and the ends of the piston rod are engaged in respective grooves in respective fixed support members such that said ends are movable horizontally in said grooves in directions substantially perpendicular to the axis of the roll to allow the axis of the roll to be moved into oblique relationship with the axis of a co-operating roll located above or below said roll.

1 Claim, 2 Drawing Figures

ROLL CALENDERS FOR CALENDERING RUBBER OR SYNTHETIC PLASTICS MATERIALS

The invention relates to a roll calender for calendering rubber or synthetic plastics materials.

Sag in a calendering roll can be compensated by a roll counter bending device or by a device which while it maintains the roll in a horizontal plane moves it into oblique relationship with a co-operating roll.

According to the invention, there is provided a roll calender for calendering rubber or synthetic plastics materials in which at least one roll of the calender has journal portions at the ends thereof supported in main support bearings and outer end portions of the journals engaged in spherical bearings, an outer portion of each spherical bearing has each of its two opposite sides rigidly connected to a respective hydraulic cylinder, each hydraulic cylinder has a piston therein with the piston secured to a vertical piston rod, intermediate the ends of the piston rod, such that counter bending of the roll can be effected by pressurisation of the hydraulic cylinders selectively above or below the pistons, and the ends of the piston rod are engaged in respective grooves in respective fixed support members such that said ends are movable horizontally in said grooves in directions substantially perpendicular to the axis of the roll to allow the axis of the roll to be moved into oblique relationship with the axis of a co-operating roll located above or below said roll.

Thus the invention provides a construction which permits sag compensation of a calender roll by both counter bending and oblique positioning.

The construction according to the invention has the advantage that by the provision of a piston rod extending in both opposite directions from the piston, the same hydraulic pressure is necessary to exert the same force, either for positive or negative counter bending, by virtue of the equal-sized oppositely directed active surfaces of the piston. This is advantageous since the extent of counter bending or at least the force being applied to effect counter bending can simply be indicated by a pressure gauge. Equal indicated values for equal but just oppositely directed pressures are made possible, so simplifying the use of pressure control systems operated via computer plants.

The double-sided mounting of the outer portion of the spherical bearing to the cylinders of the roll counter bending device provides for particularly good guidance for the counter bending device and prevents its rotation about the roll axis.

Figure 2:
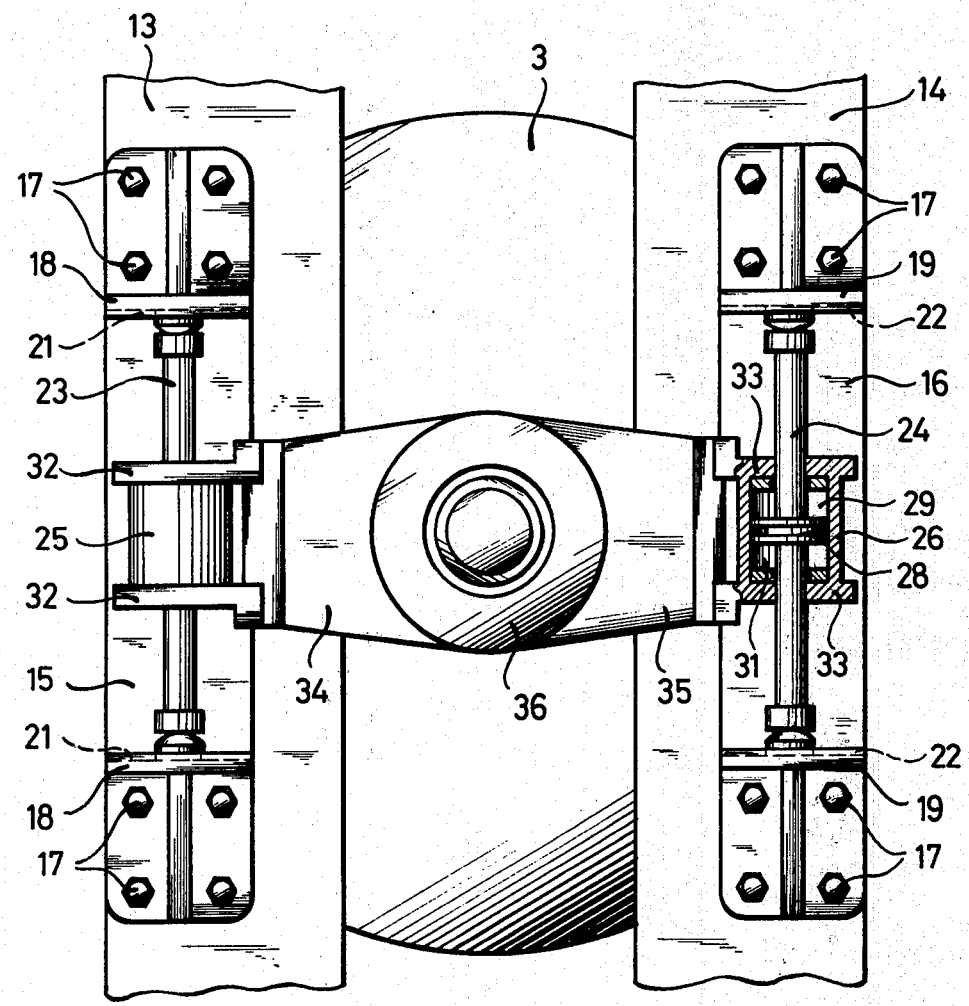

The invention is diagrammatically illustrated by way of example in the accompanying drawings, in which:

FIG. 1 shows the left-hand end portion of a roll of a roll calender according to the invention; and FIG. 2 shows an end view corresponding to FIG. 1 but not showing a main support bearing and with one hydraulic cylinder shown in cross-section.

Referring to the drawings, a calendering roll 3 has at each end a central journal collar 4 and adjacent thereto a roll journal 5. The inner portion of the roll journal 5 is supported in a main support bearing 6 and, the outer end part of the roll journal 5 co-operates with sag compensating devices 7. Only the left-hand end of the calendering roll 3 is shown, the right-hand end being identical but oppositely handed.

The main support bearing 6 (FIG. 1) comprises two side-by-side roller bearings 8 and 9 with the inner race of the roller bearing 9 abutting the journal collar 4. A bearing housing 11 encloses the two roller bearings 8 and 9 and is closed by a cover part 12. The main support bearing 6 is supported against vertical movement and guided for horizontal movement in calendering stands 13 and 14 in known manner.

On the side remote from the calendering roll 3, on the calender stands 13 and 14 are mounts 15 and 16 for the counter bending device, the mounts 15 and 16 being secured to the stands 13 and 14 by bolts 17. Each of the mounts 15 and 16 has two spaced apart support members 18, 19 facing each other and each support member is provided with a groove 21, 22 extending horizontally and perpendicular to the axis of the roll 3. Displaceably supported in the grooves 21 and 22 are the opposite ends of piston rods 23 and 24 of double acting hydraulic cylinders 25 and 26 disposed between the support members 18 and 19. The space inside each hydraulic cylinder 25, 26 is sub-divided into an upper pressure space 29 and a lower pressure space 31 by a working piston, 28 connected rigidly to the piston rod 23, 24. The pressure spaces 29 and 31 are connected by way of connections and control arrangements (not shown) to a hydraulic pressurised medium source, (not shown).

The hydraulic cylinders 25 and 26 have fixing flanges 32, 33 by which they are rigidly connected to lateral extensions 34 and 35 of an outer portion 36 of a spherical bearing. The outer portion 36 is annular and spherically shaped on its inside face. Correspondingly, an inner bearing member 37, mounted on a bush 38 on the end of the roll journal 5 and co-operating with the outer portion 36, has a spherically shaped outer surface.

The sag compensating devices function in the following way:

In order to produce a counter bending of the calendering roll 3 upwardly, pressure is applied to the lower pressure spaces 31 of the hydraulic cylinders 25 and 26. The upper pressure spaces 29 remain unpressurised. The hydraulic cylinders 25 and 26 connected to the outer portion 36 accordingly move downwardly. Via the outer portion 36 and the inner bearing member 37, a downwardly directed force is thus exerted on the outer end of the roll journal 5. The calendering roll 3 is thus counter bent upwardly since the main support bearing 6 acts as a pivot point.

If it is desired for the calendering roll 3 to be counter bent downwardly, pressure is applied to the upper pressure space 29. The effect is then the reverse of that described above.

In order to achieve an oblique positioning of the calendering roll 3, with respect to a co-operating roll located above or below the roll 3 (shown in dashed lines in FIG. 1), in addition to the counter bending action, the main support bearing 6 is in per se known manner acted on to displace it in a horizontal plane out of a central position by adjusting means (not shown). The journal end thus swings and, via the outer portion 36 and the hydraulic cylinders 25 and 26, causes the ends of the piston rods 23 and 24 to move along the grooves 21, 22. The spherical constructions of the bearings at the outer ends of the journals permit a tension free oblique positioning of the calendering roll 3.

What is claimed is:

1. In a roll calender, for calendering rubber or synthetic plastics material and having roll counter bending means and means permitting oblique positioning of the roll, in combination a roll; journal portions at the ends of said roll; main support bearings on inner portions of said journals; spherical bearings on outer end portions of said journals; respective hydraulic cylinders rigidly connected to opposite sides of outer members of each of said spherical bearings; a piston in each of said hydraulic cylinders; a vertical piston rod for each said piston with said piston secured to said piston rod intermediate the ends of said piston rod, such that counter bending of said roll can be effected by pressurisation of said hydraulic cylinders selectively above or below said pistons; and fixed support members with grooves therein, ends of said piston rods being engaged in respective ones of said grooves such that said ends are movable horizontally in said grooves in directions substantially perpendicular to the axis of said roll to allow said axis of said roll to be moved into oblique relationship with the axis of a co-operating roll located above or below said roll.

* * * * *